3,092,655
4,4,5,5 - TETRAFLUORO - 1,3 - CYCLOPENTANEDI-
CARBOXYLIC ACID, ITS ESTERS, AND PREPA-
RATION THEREOF
Wallace Raymond Brasen, Wilmington, Del., assignor to
E. I. du Pont de Nemours and Company, Wilmington,
Del., a corporation of Delaware
No Drawing. Filed Dec. 14, 1960, Ser. No. 75,685
5 Claims. (Cl. 260—468)

This invention relates to a fluorinated alicyclic dicarboxylic acid and esters thereof, and to methods for making said compounds.

The dicarboxylic acid of the invention is 4,4,5,5-tetrafluoro-1,3-cyclopentanedicarboxylic acid. In general, it is made by an oxidation reaction of 5,5,6,6-tetrafluorobicyclo-[2.2.1]-2-heptene with nitric acid.

In carrying out the oxidation reaction, the nitric acid used is aqueous nitric acid having an initial concentration of about 50–85% $HNO_3$. With nitric acid below about 50% concentration, the reaction is too slow. Nitric acid stronger than about 85% causes side reactions which, of course, decrease the yield of the desired product. The preferred concentration of nitric acid is approximately 70%.

The amount of nitric acid used for the oxidation process should be at least stoichiometric, i.e., at least one and one-third moles of nitric acid should be present for each mole of 5,5,6,6-tetrafluorobicyclo[2.2.1]-2-heptene. Preferably, the amount of nitric acid used is in excess of this ratio, for example, one mole of tetrafluorobicyclo[2.2.1]-2-heptene and twenty moles of nitric acid. There is no upper limit to the amount of nitric acid that can be present except, of course, as dictated by economics. Though oxidation with nitric acid represents the preferred procedure, other conventional oxidizing agents are operable, including, for example, chromic acid and potassium permanganate and the like.

It is important that the reaction temperature employed in carrying out the oxidation reaction be maintained between about 75 and about 130° C. Below 75° C., the reaction does not occur, or is so slow as to be economically unfeasible. At temperatures above 130° C., numerous side reactions occur. The preferred temperature range is 95–100° C. The reaction time is dependent on the temperature, i.e., the higher the temperature within the specified range, the shorter the reaction time.

Although it is not necessary to do so, the oxidation reaction is advantageously carried out in the presence of a lower fatty acid which is resistant to oxidation. Because of its low cost, availability, and resistance to oxidation, glacial acetic acid is particularly preferred. The use of a lower fatty acid facilitates the control of the reaction and helps in the dissolution of the olefin reactant. If acetic acid is used, it is preferred to use about three parts by weight of acetic acid for each part by weight of the olefin.

A catalyst is not essential in the oxidation but is often advantageous, however, since the presence of a catalyst will normally give better yields at lower temperatures. Suitable catalysts include pulverized cobalt, nickel or vanadium, as well as the oxides of vanadium, tantalum, lead, manganese, cobalt, chromium, and molybdenum.

It has been also found that sodium nitrite promotes the reaction by initiating the formation of oxides of nitrogen to encourage the oxidation, but the oxidation can be carried out in the absence of sodium nitrite.

The 4,4,5,5-tetrafluoro - 1,3 - cyclopentanedicarboxylic acid formed is separated from the reaction mixture by conventional methods, such as by cooling the mixture and then concentrating the reaction mixture at reduced pressure, preferably while adding water intermittently during the concentration to facilitate the removal of nitric acid. The remaining liquid can then be extracted with benzene, or other liquid aromatic hydrocarbons which are inert to the novel acid, to remove impurities and for recrystallizations of the acid.

4,4,5,5-tetrafluoro-1,3-cyclopentanedicarboxylic acid is useful in applications where dicarboxylic acids are commonly used, for example, in the preparation of polyester resinous compositions by the condensation at elevated temperatures of the dicarboxylic acids with polyhydric alcohols, e.g., ethylene glycol.

The following examples are given to illustrate the invention. Parts are by weight.

*Example 1*

A solution of 65.6 parts of 5,5,6,6-tetrafluorobicyclo-[2.2.1]-2-heptene in 210 parts of glacial acetic acid was added dropwise over a period of 2 hours to a mixture containing 767 parts of 70% nitric acid, 0.4 part of sodium nitrite and 1.0 part of vanadium pentoxide. The temperature of the mixture during the addition of the olefin was maintained between about 95 and about 100° C. and, after all of the olefin had been added, the mixture still was maintained at this temperature for an additional 4 hours. The resulting light-blue solution was cooled and concentrated at reduced pressure. Water was added intermittently during the concentration to facilitate the removal of nitric acid. The product oil was refluxed with three 1320-part portions of benzene. The benzene was decanted and a white product crystallized upon cooling. Thirty parts of crude product was obtained. Repeated recrystallizations of the product from benzene gave 4,4,5,5-tetrafluoro-1,3-cyclopentanedicarboxylic acid having an M.P. of 140–141° C.

*Analysis.*—Calcd. for $C_7H_6O_4F_4$: C, 36.53; H, 2.63; F, 33.03. Found: C, 36.4; H, 2.7; F, 32.5.

*Example 2*

4,4,5,5-tetrafluoro - 1,3 - cyclopentanedicarboxylic acid (58.3 parts) was refluxed for four hours in 567 parts of methanol containing 10 parts of hydrogen chloride. Distillation of the mixture at reduced pressure gave dimethyl 4,4,5,5-tetrafluoro - 1,3 - cyclopentanedicarboxylate (B.P. 83–84° C./1 mm. Hg). The distillate crystallized and had a melting point of about 23° C.

*Example 3*

The di-n-butyl ester of 4,4,5,5-tetrafluoro-1,3-cyclopentanedicarboxylic acid was prepared from 800 parts of n-butyl alcohol by the method of Example 2 except that 40 parts of sulfuric acid was used instead of hydrogen chloride. Distillation of the mixture at reduced pressure gave di-n-butyl 4,4,5,5-tetrafluoro-1,3-cyclopentanedicarboxylate (B.P. 74–9° C./0.15 mm. Hg). The compound has a dielectric constant of $\epsilon=12.7$.

While Examples 2 and 3 illustrate the preparation of the dimethyl and di-n-butyl esters, esters of other aliphatic alcohols, e.g., 2-ethylhexanol and decanol; of cycloaliphatic alcohols, e.g., cyclohexanol and cyclopentanol; of aromatic alcohols, e.g., phenols, cresols, and benzyl alcohol; and heterocyclic alcohols, e.g., furfuryl and tetrahydrofurfuryl alcohol, are similarly prepared. The esters are suitable as lubricants and the di-n-butyl ester is particularly useful as a dielectric fluid.

I have described and illustrated my invention in the foregoing specification. Since many variations may be made in practicing the invention without departing from the scope or spirit thereof, I intend to be limited only by the following claims.

I claim:
1. A process for the preparation of 4,4,5,5-tetrafluoro-

1,3-cyclopentanedicarboxylic acid which comprises contacting 5,5,6,6-tetrafluorobicyclo[2.2.1]-2-heptene with 50–85% aqueous nitric acid at a temperature between about 75 and 130° C.

2. A process as claimed in claim 1, wherein the reaction is effected in the presence of acetic acid.

3. 4,4,5,5-tetrafluoro-1,3-cyclopentanedicarboxylic acid.

4. Di-n-butyl 4,4,5,5-tetrafluoro-1,3-cyclopentane-dicarboxylate.

5. Dimethyl 4,4,5,5-tetrafluoro-1,3-cyclopentane-dicarboxylate.

References Cited in the file of this patent

UNITED STATES PATENTS 2,957,022 Cohen _____ Oct. 18, 1960

FOREIGN PATENTS 1,224,076 France _____ Feb. 8, 1960

OTHER REFERENCES

Baer, "Fluoro Alcohols," Ind. and Eng. Chem., 51, 829–30 (1949).

Lovelace et al., Aliphatic Fluorine Compounds (New York, 1958), page 230.